United States Patent Office 3,745,193
Patented July 10, 1973

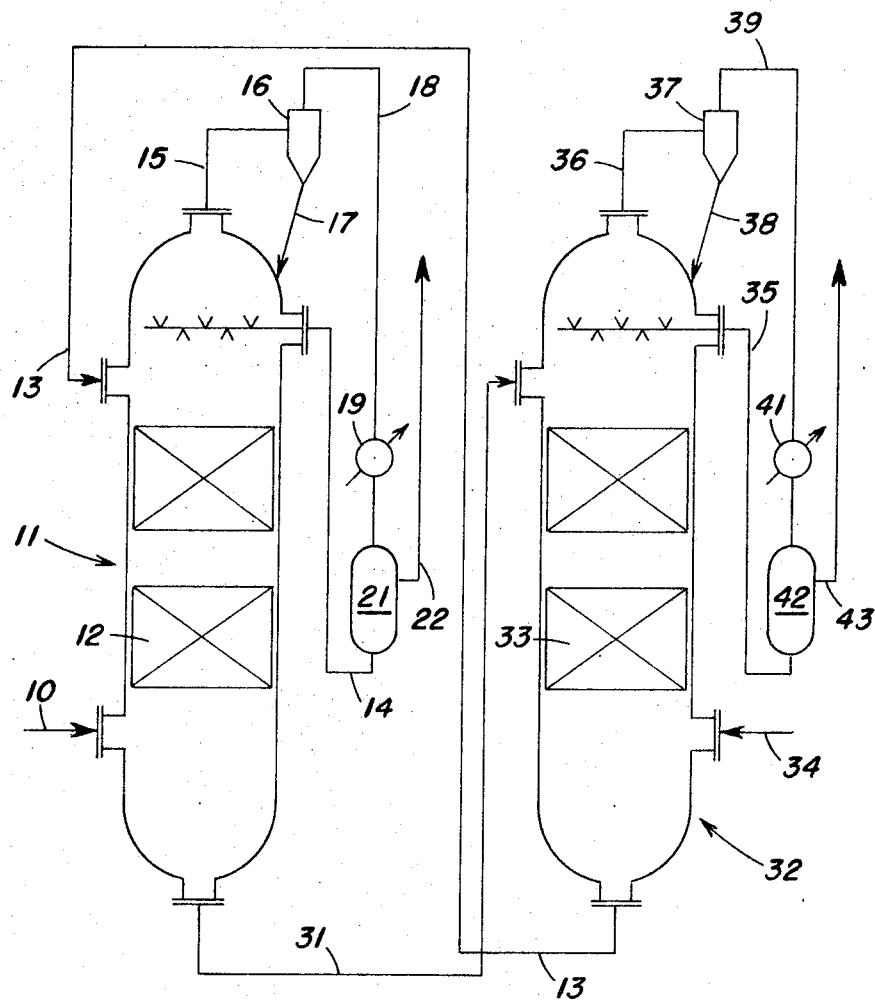

3,745,193
PROCESS FOR PRODUCING A PHENOL BY OXIDATION OF AN AROMATIC HYDROCARBON
Herbert Riegel, Palisades, N.J., Harvey D. Schindler, New York, N.Y., and Morgan C. Sze, Upper Montclair, N.J., assignors to The Lummus Company, Bloomfield, N.J.
Filed Oct. 23, 1968, Ser. No. 769,813
Int. Cl. C07c 37/00
U.S. Cl. 260—621 G  5 Claims

ABSTRACT OF THE DISCLOSURE

Process for producing an alcohol from a feed containing an alkane, cycloalkane, aromatic hydrocarbon, or halo-substituted derivatives thereof wherein the feed is contacted with water, preferably as steam, and a melt containing a multivalent metal halide in both its higher and lower valence state, such as a mixture of cupric and cuprous chloride. In accordance with a preferred embodiment, the contacting is effected in the presence of an oxygen containing gas or the melt is previously contacted with an oxygen-containing gas to produce the corresponding oxyhalide of the metal, whereby the reaction may be effected on a continuous basis.

---

This invention relates to the production of alcohols and more particularly to a process for oxidizing a hydrocarbon or halo-substituted derivative thereof to the corresponding alcohol.

The production of alcohols such as ethanol and phenol is extremely important in that such compounds are frequently used industrial chemicals. The commercial processes for producing ethanol generally employ ethylene, an expensive chemical, as a starting material and involve a plurality of reaction stages. Similarly, the production of phenol, although employing benzene as a starting material, involves a plurality of reaction stages which increases overall production costs.

An object of this invention is to provide a new and improved process for the production of alcohols.

Another object of this invention is to provide a process for producing alcohols which may be effected in a single reactor.

A further object is to provide a process for producing alcohols which permits the use of cheaper starting materials.

These and other objects of the invention should be more readily apparent from the following detailed description thereof when read with reference to the accompanying drawing wherein:

The drawing is a simplified schematic flow diagram of an embodiment of the invention.

The objects of this invention are broadly accomplished in one aspect by contacting a feed containing an alkane, cycloalkane, aromatic hydrocarbon or halo-substituted derivatives thereof with water, preferably as steam, and a melt containing a multivalent metal halide in both its higher and lower valence state, resulting in conversion thereof to the corresponding alcohol. The contacting may be effected in the presence of other reagents, as hereinafter described, with reference to preferred embodiments of the invention. It is to be understood that the product resulting from an aromatic hydrocarbon or halo-substituted derivative thereof is a phenol and the term alcohol as used herein includes such phenols.

The melt contains a halide of a multivalent metal; i.e., a metal having more than one positive valence state, such as manganese, iron, copper, cobalt and chromium, preferably a chloride or bromide of the metal, with the copper chlorides and bromides, in particular the copper chlorides, being preferred. In the case of higher melting multivalent metal halides, such as copper chlorides, a halide of a univalent metal; i.e., a metal having only one positive valence state, which is nonvolatile and resistant to the action of oxygen under the process conditions is added to the multivalent metal halide to form a molten salt mixture having a reduced melting point. The univalent metal halides, the chlorides and bromides, particularly the chlorides, being preferred, are preferably alkali metal halides, such as potassium and lithium chloride in particular, but it is to be understood that other metal chlorides and mixtures thereof, such as the heavy metal halides of Groups I, II, III and IV of the Periodic Table; e.g., zinc, silver, and thallium chloride, may also be employed. The univalent metal halides are generally added in an amount sufficient to adjust the melting point of the molten salt mixture to a temperature of below about 500° F., and in the case of a salt mixture of copper chloride and potassium chloride, the composition of the melt ranges between about 20% and about 40% preferably about 30%, by weight, potassium chloride, with the remainder being copper chloride. It is to be understood, however, that in some cases the catalyst melt may have a melting point higher than 500° F., provided the catalyst remains in the form of the melt throughout the processing steps. It is further to be understood that the melt may contain a mixture of multivalent metal halides or other promoters. It is also to be understood that in some cases the multivalent metal halides may be maintained as a melt without the addition of a univalent metal halide.

The feed, as hereinabove described, may be an alkane, cycloalkane, aromatic hydrocarbon or a halo-substituted derivative of the above compounds, with bromo- and chloro-, particularly chloro-, substituted derivatives being generally preferred. The alkane is preferably one which contains no more than about 18 carbon atoms, such as, ethane, propane, n-butane, isobutane, hexanes, heptanes, etc., and the cycloalkane is preferably one having from about 5 to about 12 carbon atoms. The aromatic hydrocarbon is preferably benzene or naphthalene and in particular benzene. It is to be understood that the feed may contain two or more of the hereinabove described compounds.

The reaction for producing the alcohol, using ethane, benzene and cyclohexane, as representative feeds and copper chloride as a representative metal halide is believed to be represented by the following equations:

(1) $C_2H_6 + 2CuCl_2 + H_2O \rightarrow C_2H_5OH + 2CuCl + 2HCl$ (2) $C_6H_6 + 2CuCl_2 + H_2O \rightarrow C_6H_5OH + 2CuCl + 2HCl$ (3) $C_6H_{12} + 2CuCl_2 + H_2O \rightarrow C_6H_{11}OH + 2CuCl + 2HCl$ It is to be understood that the hereinabove described equations are only representative of the reaction sequence which is believed to occur and, therefore, the scope of the invention is not to be limited by such a theoretical reaction sequence.

It should be apparent from the hereinabove described reaction sequence that there is a continuous depletion of the higher valent metal halide, i.e., cupric chloride, and a net production of hydrogen chloride. Therefore, if the reaction is to be effected on a continuous basis, a provision must be made for regeneration of the cupric chloride and disposal of the hydrogen chloride.

In accordance with one preferred embodiment of the invention, the feed, including steam, is contacted with the melt, containing the multivalent metal halide in both its higher and lower valence state, in the presence of an oxygen-containing gas, such as air. This procedure may be represented by the following reaction sequence, using ethane as a representative example:

(4) $C_2H_6 + H_2O + 2CuCl_2 \rightarrow C_2H_5OH + 2HCl + 2CuCl$ (5) $2CuCl + \frac{1}{2}O_2 \rightarrow CuOCuCl_2$ (6) $2HCl + CuOCuCl_2 \rightarrow 2CuCl_2 + H_2O$ The combination of Equations 4, 5 and 6 results in Equation 7:

(7) $C_2H_6 + \frac{1}{2}O_2 \rightarrow C_2H_5OH$

Thus, in accordance with this embodiment there is no net production of hydrogen chloride and no net depletion of cupric chloride. It is further noted that although water does not appear to be required in the overall reaction sequence defined by Equation 7, the addition of steam is generally necessary to achieve the desired conversions, although some alcohol; e.g., phenol, may be produced without the addition of water.

As an alternative procedure to the hereinabove described preferred embodiment, the melt containing a mixture of a multivalent metal halide in both its higher and lower valence state may be initially contacted with oxygen and the resulting product, containing the corresponding oxyhalide of the multivalent metal, is then contacted with steam and the feed to be converted to an alcohol. This procedure is of greater commercial value in that among other benefits, oxygen does not contact the feed, thereby decreasing any losses which may result from combustion of the feedstock. It should be apparent that this procedure proceeds in accordance with the reaction mechanism hereinabove described with the reaction represented by Equation 5 being effected in the oxygen contacting step and the reactions represented by Equations 4 and 6 being effected in the subsequent contacting of feed and melt.

As a further embodiment, the feed to be converted to an alcohol is contacted with the melt, containing the multivalent metal halide in both its higher and lower valence state, in the presence of a free-halogen containing gas, corresponding to the halide of the multivalent metal. This procedure may be represented by the following reaction sequence, using ethane as a representative example:

(8) $C_2H_6 + H_2O + 2CuCl_2 \rightarrow C_2H_5OH + 2HCl + 2CuCl$ (9) $2CuCl + Cl_2 \rightarrow 2CuCl_2$ This procedure although maintaining essentially no net loss of cupric chloride, results in a net production of hydrogen chloride and consequently is less preferred than the hereinabove described preferred embodiment. It is to be understood that similarly to the preferred embodiment, the melt may be contacted with the free halogen containing gas separately from the alcohol production step to replenish the melt in accordance with the reaction represented by Equation 9.

As a further alternative embodiment, the hydrogen chloride generated in the alcohol production, as represented by Equations 1-3, may be recovered from the effluent and employed along with an oxygen-containing gas to contact the cupric chloride depleted melt to regenerate cupric chloride as represented by the following equations:

(10) $2CuCl + \frac{1}{2}O_2 \rightarrow CuOCuCl_2$

(11) $CuOCuCl_2 + 2HCl \rightarrow 2CuCl_2 + H_2O$

This procedure is also less preferred, but may be employed within the scope of the invention.

The alcohol production or contacting of the melt with chlorine, oxygen or hydrogen chloride, as hereinabove described, is generally effected at temperatures from about 500° F. to about 1200° F., preferably from about 500° F. to about 1000° F. and pressures from about 1 to about 100 atmospheres. The contacting is preferably effected in a countercurrent fashion, with the feed as a continuous vapor phase, at residence times from about 1 to about 100 seconds. The choice of optimum reaction conditions varies with the particular reactants and, therefore, the hereinabove described conditions are illustrative of the invention and the scope thereof is not to be limited thereby. It is further to be understood that byproducts, e.g., chlorinated derivatives, are also produced during the reaction and, therefore, the reaction conditions are controlled to reduce such production. The separation of the resulting byproducts in order to recover the desired product may be effected by a wide variety of well-known procedures and, therefore, no detailed explanation thereof is deemed necessary.

It should be further apparent from the hereinabove noted alcohol production reaction sequence that the melt containing the multivalent metal halide participates in the reaction sequence and accordingly does not behave only as a catalyst. Therefore, the multivalent metal halides must be present in an amount sufficient to meet the stoichiometric requirements of the reaction sequence and in general the melt contains at least 3 weight percent of the higher valent metal halide, although greater amounts are generally preferred. In some cases, the addition of chlorine may be required in order to maintain the necessary quantity of cupric chloride.

The melt in addition to functioning as a reactant and/or catalyst is a temperature regulator. Thus, the circulating melt has a high heat absorption capacity thereby preventing runaway reaction during the exothermic alcohol production and oxygen contacting steps. The absorbed heat of reaction may be employed to heat the various reactants to reaction temperature. Alternatively, or in addition to such an expedient, the melt may be contacted with an inert gas coolant to remove any additional heat of reaction, with the inert gas being subsequently cooled and re-employed for removing heat from the melt.

The invention will now be further described with reference to an embodiment thereof illustrated in the accompanying drawing. It is to be understood, however, that the scope of the invention is not to be limited thereby.

Referring now to the drawing, an oxygen-containing gas in line 10, such as air, is introduced into a reactor 11, containing suitable packing 12 or other liquid-vapor contacting devices. A melt containing a multivalent metal halide in both its higher and lower valence state, such as a mixture of cupric and cuprous chloride, is introduced into reactor 11 through line 13 in the form of a melt and countercurrently contacts the ascending oxygen-containing gas. The melt may further contain an alkali metal chloride, such as potassium chloride. As a result of such contact, a portion of the cuprous chloride is exothermically converted to copper oxychloride.

An oxygen depleted gas in the top of the reactor 11 is contacted with a quench liquid introduced through line 14, resulting in condensation of vaporized melt and vaporization of quench liquor. The vaporized quench liquid and oxygen-depleted gas is withdrawn from reactor 11 through line 15 and introduced into a cyclone separator 16 to effect separation of entrained catalyst.

The separated catalyst is withdrawn from separator 16 through line 17 and returned to the reactor 11. The combined oxygen-depleted gas-vaporized quench liquid is withdrawn from separator 16 through line 18, passed through condenser 19 to effect condensation of the quench liquid and the vapor-liquid mixture introduced into a separator 21. The quench liquid is withdrawn from separator 21 in line 14 and recycled to the reactor 11. The oxygen-depleted gas is withdrawn from separator 21 through line 22 and passed to waste.

The melt-containing a mixture of cuprous chloride, cupric chloride and copper oxychloride, is withdrawn from reactor 11 through line 31 and introduced into the top of a reactor 32, containing suitable packing 33 or other gas-liquid contacting devices. A feed to be converted to an alcohol, such as ethane or benzene, is introduced in admixture with steam into the bottom of vessel 32 through line 34 and countercurrently contacts the descending melt to effect conversion of the feed to an alcohol. The melt withdrawn from the bottom of vessel 32 through line 13 is recycled to reactor 11.

A gaseous effluent containing the corresponding alcohol is contacted in the top of vessel 32 with a quench liquid introduced through line 35, resulting in condensation of vaporized catalyst melt and vaporization of the quench liquid. The vaporized quench liquid and effluent is withdrawn from vessel 32 through line 36 and introduced into a cyclone separator 37 to effect removal of entrained catalyst. The separated catalyst is withdrawn from separator 37 through line 38 and recycled to the vessel 32. The vaporized quench liquid and gaseous effluent are withdrawn from separator 37 through line 39, passed through condenser 41 to effect condensation and cooling of the quench liquid and the gas-liquid mixture introduced into a separator 42. The now cooled quench liquid is withdrawn from separator 42 through line 35 and recycled to the reactor 32. The effluent is withdrawn from separator 42 through line 43 and passed to separation and recovery.

It is to be understood that numerous variations of the hereinabove described processing sequence are possible within the spirit and scope of the invention. Thus, for example, the alcohol production reaction may be effected in a single reactor having two separate zones, one for the introduction of an oxygen-containing gas for contact with the melt and the other for contacting the resulting oxygenated melt with the feed to be converted to an alcohol. Alernatively, as hereinabove described, the melt containing the multivalent metal halide in both its higher and lower valence state, may be contacted with a mixture of an oxygen-containing gas and a feed to be converted to an alcohol in a single reaction zone. Similarly, a halogen containing gas, such as chlorine, may be employed instead of an oxygen-containing gas in which case as hereinabove described, there is a net production of hydrogen chloride. These and other modifications should be apparent to those skilled in the art from the teachings contained herein.

The invention is further illustrated by the following examples but the scope of the invention is not to be limited thereby:

EXAMPLE I

Ethanol was produced by contacting ethane with a copper chloride melt continuously circulating between the ethane contacting step and an air contacting step. The conditions were as follows:

| | |
|---|---|
| Reaction temperature °C | 455 |
| Reaction pressure atm | 1 |
| Molten salt: | |
| KCl wt. percent | 29 |
| $CuCl_2$ do | 23 |
| CuCl do | 48 |
| Residence time seconds | 4.5 |
| Duration of test hours | 2.5 |
| Gas hourly space velocity (GHSV) | 162 |
| Feed rate, gm.-mole/hr.: | |
| Ethane | 0.40 |
| Steam | 0.13 |
| Chlorine | 1.17 |
| Ethane conversion percent | 19.8 |

| Component: | Products Mole percent ethane converted |
|---|---|
| $CO_2$ | 1.2 |
| $C_2H_3Cl$ | 3.0 |
| $C_2H_5Cl$ | 27.2 |
| $C_2H_4$ | 27.9 |
| $C_2H_4Cl_2$ | 29.6 |
| $C_2H_5OH$ | 11.1 |
| | 100.0 |

Chlorine in product stream as HCl: 0.021 mole/hr.

EXAMPLE II

Ethanol is produced by contacting ethyl chloride with a copper chloride melt continuously circulating between the ethyl chloride contacting step and an air contacting step. The conditions are as follows:

| | |
|---|---|
| Reaction temperature °C | 455 |
| Reaction pressure atm | 1 |
| Molten salt: | |
| KCl wt. percent | 29 |
| $CuCl_2$ do | 23 |
| CuCl do | 48 |
| Residence time seconds | 6 |
| Duration of test hours | 2 |
| Gas hourly space velocity (GHSV) | 122 |
| Feed Rate, gm.-mole/hr.: | |
| Ethyl chloride | 0.26 |
| Steam | 0.26 |
| Ethyl chloride conversion percent | 14.4 |

The reaction product contains ethanol.

EXAMPLE III

Phenol is produced by contacting benzene and steam with a copper chloride melt continuously circulating between the benzene contacting step and an air contacting step. The conditions are as follows:

| | |
|---|---|
| Reaction temperature °C | 398 |
| Reaction pressure atm | 1 |
| Molten salt: | |
| KCl wt. percent | 28 |
| CuCl do | 30 |
| $CuCl_2$ do | 42 |
| Residence time seconds | 10 |
| Duration of test hours | 2 |
| Gas hourly space velocity (GHSV) | 82 |
| Feed rate, gm.-mole/hr.: | |
| Benzene | 0.23 |
| Steam | 0.20 |
| Benzene conversion percent | 16.1 |

The reaction product contains phenol.

EXAMPLE IV

Cyclohexanol is produced by contacting cyclohexane with a copper chloride melt continuously circulating between the cyclohexane contacting step and an air contacting step. The conditions are as follows:

| | |
|---|---|
| Reaction temperature °C | 421 |
| Reaction pressure atm | 1 |
| Molten salt: | |
| KCl wt. percent | 30 |
| CuCl do | 41 |
| $CuCl_2$ do | 29 |
| Residence time seconds | 7.5 |
| Duration of test hours | 2 |
| Gas hourly space velocity (GHSV) | 85 |
| Feed rate, liquid ml./hr.: | |
| Cyclohexane | 73.5 |
| Steam | 12.8 |
| Conversion percent | 12.1 |

The reaction product contains cyclohexanol.

EXAMPLE V

The procedure of Example II is repeated except that the feed contains propane.

The reaction product contains propanol.

EXAMPLE VI

The procedure of Example IV is repeated except that the feed contains cyclododecane.

The reaction product contains cyclododecanol.

EXAMPLE VII

The procedure of Example III is repeated except that the melt is not circulated to an air contacting step.

The reaction product contains phenol.

EXAMPLE VIII

The procedure of Example I is repeated except that the melt has the following composition:

| | Weight percent |
|---|---|
| $FeCl_2$ | 70 |
| $FeCl_3$ | 5 |
| KCl | 25 |

The reaction product contains ethanol.

EXAMPLE IX

The procedure of Example III is repeated except that the temperature is 455° C. and the melt has the following composition:

| | Weight percent |
|---|---|
| $MnCl_2$ | 4 |
| $MnCl_4$ | 78 |
| KCl | 18 |

The reaction product contains phenol.

EXAMPLE X

The procedure of Example IV is repeated except that the feed is cyclododecane and the melt has the following composition:

| | Weight percent |
|---|---|
| $CoCl_2$ | 43 |
| $CoCl_3$ | 17 |
| KCl | 40 |

The reaction product contains cyclododecanol.

EXAMPLE XI

The procedure of Example III is repeated except that the feed is naphthalene, the temperature is 455° C. and the melt has the following composition:

| | Weight percent |
|---|---|
| $CrCl_2$ | 12 |
| $CrCl_3$ | 66 |
| KCl | 22 |

The reaction product contains naphthanol.

The hereinabove examples are also repeated with bromides and iodides of the multivalent metals with similar results.

The process of the invention is extremely advantageous in that alcohols may be produced from a wide variety of feeds in a single reactor. Furthermore, the process of the invention may produce phenol by direct oxidation of the aromatic nucleus in a single reaction zone. As another advantage, the alcohols may be produced from saturated hydrocarbons, which results in lower overall costs. These and other advantages of the invention should be readily apparent to those skilled in the art.

Numerous modifications and variations in the present invention are possible in light of the above teachings and, therefore, it is to be understood that the invention may be practiced otherwise than as particularly described.

What is clamied is:

1. A process for producing a phenol from a feed containing an aromatic hydrocarbon having no more than two aromatic rings, comprising:
    (a) contacting in a first zone at a temperature from about 500° F. to about 1200° F., a melt comprising the higher and lower valent metal chlorides of a metal selected from the group consisting of copper, manganese, iron, cobalt and chromium with an oxygen-containing gas to produce the oxychloride of the metal;
    (b) contacting in a second zone at a temperature from about 500° F. to about 1200° F. the melt from Step (a) comprising the higher and lower valent metal chloride and the oxychloride wtih the feed and steam to produce the corresponding phenol;
    (c) recovering the phenol; and
    (d) passing melt from Step (b) to Step (a).

2. The process of claim 1 wherein the melt in Step (b) comprises cuprous chloride, cupric chloride and copper oxychloride.

3. The process of claim 1 wherein the melt further comprises, as a melting point depressant, a member selected from the group consisting of the alkali metal chlorides and the heavy metal chlorides of Groups I, II, III and IV of the Periodic Table.

4. The process of claim 2 wherein the melt further comprises, as a melting point depressant, potassium chloride.

5. The process as defined in claim 2 wherein the feed contains benzene.

References Cited
UNITED STATES PATENTS

| | | | |
|---|---|---|---|
| 3,234,291 | 2/1966 | Kelly | 260—629 |
| 2,367,731 | 1/1945 | Moyer et al. | 26—621 G |
| 2,760,991 | 8/1956 | Toland | 260—621 G |
| 3,219,689 | 11/1965 | Bigot et al. | 260—621 GX |
| 3,277,184 | 11/1966 | Ryland et al. | 260—621 GX |
| 3,415,885 | 12/1968 | Hooper | 260—621 GX |

LEON ZITVER, Primary Examiner

N. MORGENSTERN, Assistant Examiner

U.S. Cl. X.R.

260—617 H, 617 M, 618 C, 618 D, 618 C, 631 R, 632 C, 633, 640, 650 R, 654 A, 659 A, 683 R, 629, Dig. 42

UNITED STATES PATENT OFFICE
CERTIFICATE OF CORRECTION

Patent No. 3,745,193                     Dated       July 10, 1973

Inventor(s)  H. Riegel et al

It is certified that error appears in the above-identified patent and that said Letters Patent are hereby corrected as shown below:

Column 5, line 62, "1.17" should --0.17--; and

Column 8, Claim 3, line 26, "1" should be --2--.

Signed and sealed this 27th day of November 1973.

(SEAL)
Attest:

EDWARD M. FLETCHER, JR.
Attesting Officer

RENE D. TEGTMEYER
Acting Commissioner of Patents